United States Patent
Wang

(10) Patent No.: US 9,113,494 B2
(45) Date of Patent: Aug. 18, 2015

(54) METHOD AND WIRELESS COMMUNICATION SYSTEM FOR PROVIDING DOWNLINK CONTROL SIGNALLING FOR COMMUNICATION APPARATUS

(71) Applicant: Industrial Technology Research Institute, Hsinchu (TW)

(72) Inventor: Chun-Yen Wang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 157 days.

(21) Appl. No.: 13/629,628

(22) Filed: Sep. 28, 2012

(65) Prior Publication Data

US 2013/0083707 A1     Apr. 4, 2013

Related U.S. Application Data

(60) Provisional application No. 61/540,548, filed on Sep. 29, 2011.

(51) Int. Cl.
    *H04W 72/12* (2009.01)
(52) U.S. Cl.
    CPC ................... *H04W 72/1289* (2013.01)
(58) Field of Classification Search
    CPC ..... H04L 5/001; H04L 5/0053; H04L 5/0098; H04L 5/0094; H04L 5/0055; H04L 1/1861; H04L 1/1854; H04L 5/0091; H04L 1/0031
    See application file for complete search history.

(56) References Cited

U.S. PATENT DOCUMENTS

| | | | |
|---|---|---|---|
| 6,721,325 B1 | 4/2004 | Duckering et al. | |
| 2009/0088148 A1 | 4/2009 | Chung et al. | |
| 2010/0254268 A1 | 10/2010 | Kim et al. | |
| 2010/0322173 A1 | 12/2010 | Marinier et al. | |
| 2011/0134774 A1* | 6/2011 | Pelletier et al. | 370/252 |
| 2011/0143796 A1 | 6/2011 | Lee et al. | |
| 2011/0269442 A1* | 11/2011 | Han et al. | 455/418 |
| 2011/0274066 A1 | 11/2011 | Tee et al. | |
| 2011/0317653 A1 | 12/2011 | Kwon et al. | |
| 2012/0087271 A1* | 4/2012 | Blanz et al. | 370/252 |
| 2013/0272259 A1* | 10/2013 | Kim et al. | 370/329 |

FOREIGN PATENT DOCUMENTS

| | | |
|---|---|---|
| CN | 101789823 | 7/2010 |
| CN | 101909329 | 12/2010 |
| CN | 201967138 U | 9/2011 |

OTHER PUBLICATIONS

"Scheduling timing in CA with different TDD UL-DL configurations", Samsung, 3GPP TSG RAN WG1 #67, R1-114219, Nov. 2011, pp. 1-3.

(Continued)

*Primary Examiner* — Fan Ng
(74) *Attorney, Agent, or Firm* — Jianq Chyun IP Office

(57) ABSTRACT

A method and a wireless communication system for providing downlink (DL) control signalling for a communication apparatus are provided. In the method, at least two scheduling cells are configured for providing DL control signalling, and the DL control signalling is provided on one or more of the at least two scheduling cells for a scheduled cell.

39 Claims, 12 Drawing Sheets

(56) References Cited

OTHER PUBLICATIONS

"Support of Mixed Inter-Band TDD Configurations in Rel-11 CA", Intel Corporation, 3GPP TSG RAN2#74 meeting, R2-113216, May 2011, pp. 1-3.

"TDD Inter-band Carrier Aggregation", CATT, 3GPP TSG RAN WG2 Meeting #75, R2-113944, Aug. 2011, pp. 1-4.

"Views on inter-band CA with different TDD configurations on different bands", Nokia Siemens Networks, Nokia Corporation, 3GPP TSG-RAN WG2 Meeting #75, R2-113896, Aug. 2011, pp. 1-4.

"Control and timing issues related to mixed TDD configurations in Inter-band CA", Intel Corporation, 3GPP TSG RAN WG2 Meeting #75, R2-114254, Aug. 2011, pp. 1-4.

"Operation Principles of CC specific TDD Configuration", Renesas Mobile Europe, 3GPP TSG-RAN WG2 Meeting #75, R2-114304, Aug. 2011, pp. 1-4.

"Discussion on Inter-band CA with Different TDD Configuration", New Postcom, 3GPP TSG-RAN2#75, R2-114404, Aug. 2011, pp. 1-3.

"Discussion about CA with different TDD UL-DL Configuration", ITRI, 3GPP TSG-RAN WG2 Meeting#75, Tdoc R2-114464, Aug. 2011, pp. 1-3.

"Office Action of Taiwan Counterpart Application", issued on Nov. 10, 2014, p. 1-p. 7.

"Office Action of China Counterpart Application", issued on Dec. 19, 2014, p. 1-p. 7.

* cited by examiner

| UL-DL Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1 (Related Art)

METHOD AND WIRELESS COMMUNICATION SYSTEM FOR PROVIDING DOWNLINK CONTROL SIGNALLING FOR COMMUNICATION APPARATUS

CROSS-REFERENCE TO RELATED APPLICATION

This application claims the priority benefit of U.S. provisional application Ser. No. 61/540,548, filed Sep. 29, 2011. The entirety of the above-mentioned patent application is hereby incorporated by reference herein and made a part of this specification.

TECHNICAL FIELD

The disclosure relates to a method and a wireless communication system for providing downlink control signalling for a communication apparatus capable of receiving and/or transmitting a plurality of component carriers.

BACKGROUND

In order to provide higher data rate transmissions and to support various applications, telecommunication service providers continually develop improvements in existing networks. Wider bandwidth allocation is a way to achieve the targets. However, it is difficult to assign a wide range contiguous spectrum for an access network due to existing operations on certain spectra. Accordingly, it is expected that broadband wireless access networks of next generation can be deployed by using a combination of different spectra. Consequently, technologies supporting a combination/concatenation of channel bandwidths to best utilize the available spectrum should be developed to enable data transmissions over multiple carriers. With the application of a scheme referred to as Carrier Aggregation or Multiple "Component Carriers" (CCs), networks can be enabled to operate over continuous or discontinuous carriers having different bandwidths.

The carrier aggregation scheme may utilize separate FFT and radio frequency (RF) modules for each individual band. Based on user capabilities, network entities (e.g. a base station (BS), a Node-B, an eNode-B, a base transceiver system (BTS), an access point (AP), a home base station, a relay station, a scatterer, a repeater, an intermediate node, an intermediary, and/or satellite-based communication base station, etc.) can serve different users with corresponding different bandwidths. With the support of multiple CCs, a BS can flexibly use limited bandwidth to achieve high throughput to improve user experience at the user equipment (UE).

In Carrier Aggregation (CA), two or more component carriers (CCs) or cells can be aggregated in order to support wider transmission bandwidths. A UE can simultaneously receive or transmit one or multiple CCs depending on its capabilities. A UE may be configured with more than one Cell. One of them is Primary Cell (PCell), and the other(s) is/are secondary cell(s) (SCell).

For example, FIG. 1 illustrates a conventional LTE TDD UL-DL configuration table. As shown in FIG. 1, there are 7 UL/DL configurations supported in LTE TDD systems, in which a LTE TDD system with TDD DL/UL subframe configuration#0 implies that Subframes 0 and 5 are DL subframes; Subframes 1 and 6 are SPECIAL subframes; and Subframe 2, 3, 4, 7, 8, 9 are UL subframes.

FIG. 2 illustrates a DL ACK/NACK Timing in TDD. For PUSCH transmissions scheduled from a serving cell c in subframe n, a UE shall determine the corresponding PHICH resource of serving cell c for receiving ACK/NACK feedbacks for PUSCH transmissions in subframe $n+k_{PHICH}$, where $k_{PHICH}$ is given in the table of FIG. 2.

On the other hand, cross-carrier scheduling is introduced for carrier aggregation in LTE Rel-10. FIG. 3 is a schematic diagram illustrating cross-carrier scheduling. Referring to FIG. 3, cross-carrier scheduling is configured to allow the control signalling (PDCCH) of a serving cell to schedule resources on another serving cell (e.g., The PDCCH of the CC#2 schedules resources for CC#3) in order to reduce PDCCH channel interference. In this example, CC#2 is the scheduling cell of the CC#3, and the CC#3 is called scheduled cell. Carrier indicator field (CIF) included in the PDCCH of the scheduling cell indicates the cell identity (e.g., CellIndex) of the scheduled cell. When the PDCCH of a SCell is configured, cross-carrier scheduling does not apply to this SCell since this SCell is always scheduled via its PDCCH. However, when a CA-capable UE is configured with two cells with different TDD UL-DL configuration, the following issues may need to take into consideration.

The first issue is: no PDCCH on the Scheduling Cell for DL or UL resource assignments. To be specific, when a CA-capable UE is configured with two cells with different TDD UL-DL configuration, some DL resources on the scheduled cell can not be allocated to the UE, because there is no PDCCH on the scheduling cell for cross-carrier scheduling. FIG. 4 illustrates an example of no PDCCH on the Scheduling Cell for DL and UL resource assignments. In this example, the scheduling Cell of the Cell#3 for a UE is the PCell (Cell#0). In other words, the DL resource of the Cell#3 at the subframe#4 shall be allocated by the subframe #4 of the PCell. However, PCell's subframe#4 is a UL subframe and there is no available DL resource that can be used for cross-carrier scheduling. Thus, the subframe#4 on Cell#3 can't be used by the UE, and the UE can't fully use the bandwidth of the aggregated Cell#3.

The second issue is on HARQ ACK/NACK feedback timing. FIG. 5 illustrates an example of HARQ ACK/NACK feedback timing. As illustrated in FIG. 5, based on HARQ ACK/NACK timing (e.g., illustrated in FIG. 2), the corresponding subframe on the scheduling cell to reply HARQ ACK/NACK for the previous PUSCH transmitted on the scheduled cell is an UL subframe. In other words, there is no DL resource to send the HARQ ACK/NACK. Thus, the UE needs to re-transmit the UL data again, because no ACK is received.

Accordingly, there is a need to develop a new scheme to provide downlink control signalling for the UE, which is configured with multiple TDD cells with different UL-DL configurations.

SUMMARY

According to an example of the disclosure, a method for providing downlink (DL) control signalling for a communication apparatus is provided. In the method, at least two scheduling cells are configured for providing DL control signalling, and the DL control signalling is provided on one or more of the at least two scheduling cells for a scheduled cell.

According to an example of the disclosure, a wireless communication system for providing DL control signalling is provided. The system comprises a communication apparatus and a base station. The base station is configured to configure at least two scheduling cells for providing DL control signalling to the communication apparatus, and provide the DL control signalling on one or more of the at least two scheduling cells for a scheduled cell.

Several exemplary examples accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary examples and, together with the description, serve to explain the principles of the disclosure.

FIG. 1 illustrates a conventional LTE TDD UL-DL configuration table.

DETAILED DESCRIPTION OF DISCLOSED EXAMPLES

The disclosure provides a method for a communication apparatus to support more than one scheduling cells. The scheduling cell(s) may provide downlink (DL) control signalling for scheduled cell(s). The DL control signalling comprises DL and/or uplink (UL) grant resource assignment information (e.g., by physical downlink control channel (PDCCH), hybrid automatic repeat request (HARQ) ACK/NACK feedbacks (e.g., by PHICH) for previous UL transmission, synchronization channel for DL timing synchronization (e.g., PSCH, SSCH), system information, or reference signalling.

Figure 6:
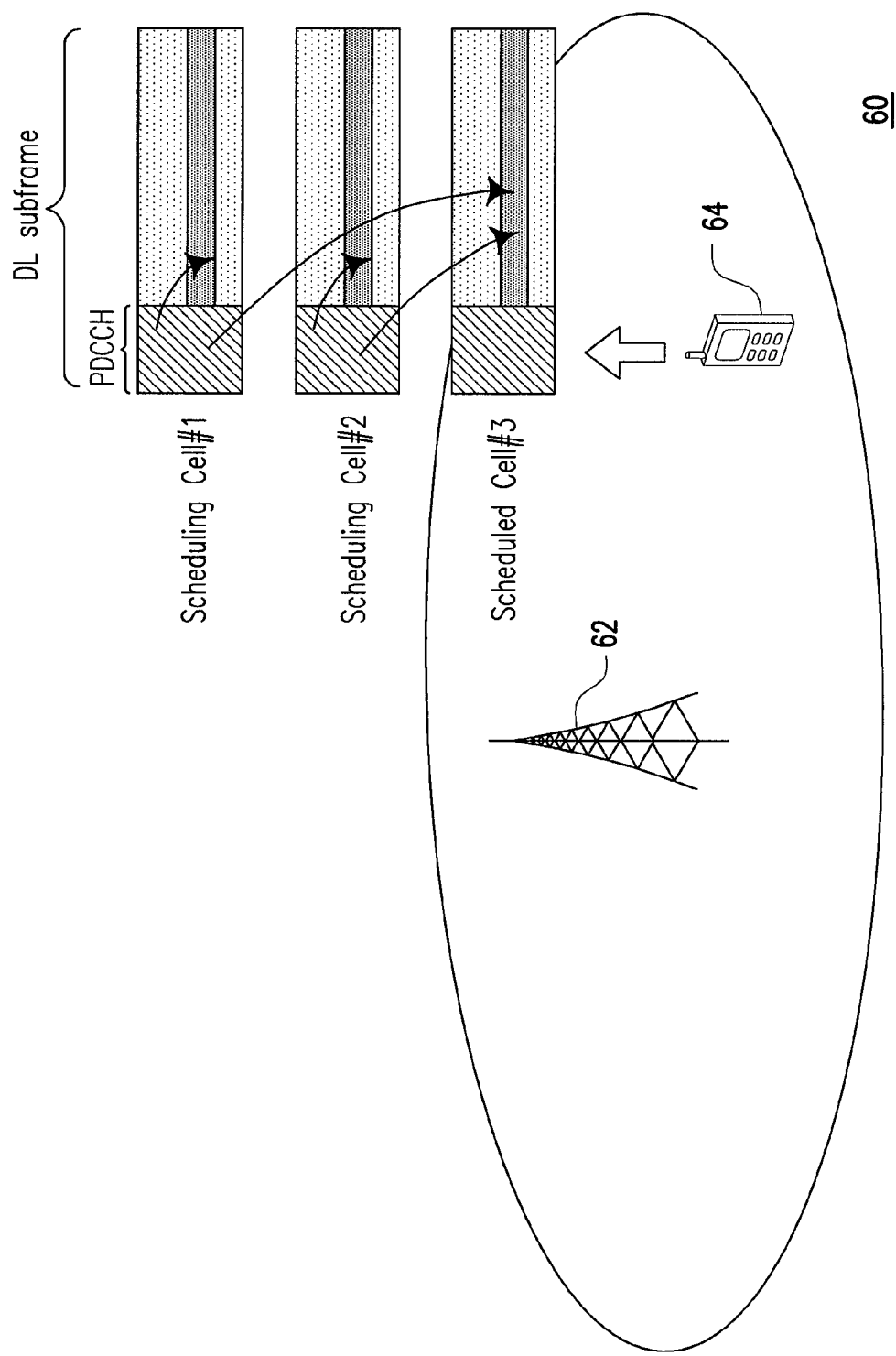
FIG. 6 is a schematic diagram illustrating the wireless communication system for providing DL control signalling for a communication apparatus according to an example of the disclosure.

FIG. 6 is a schematic diagram illustrating the wireless communication system for providing DL control signalling for a communication apparatus according to an example of the disclosure. Referring to FIG. 6, in the wireless communication system 60, the communication apparatus 64 may have a plurality of cells (e.g., Cell#1 to Cell#3), and the base station 62 may configure communication apparatus 64 with at least two scheduling cells (i.e., Cell#1 & Cell#2) and those scheduling cells may provide DL control signalling for the scheduled cell (i.e., Cell#3).

It is noted that, in the disclosure, 3GPP-like keywords are used to present the ideas; however, those ideas could be applied to other systems (e.g., IEEE 802.11, IEEE 802.16, WiMAX, etc.), which are not limited herein. In the disclosure, the term "cell" is used to represent a component carrier (CC), which may be operated on a frequency division duplex (FDD) and/or a time division duplex (TDD) system. The cell may have downlink resource to transmit signals from the base station (BS) to the communication apparatus, and/or may have uplink resource to transmit signals from the communication apparatus to the base station. For example, the term "PCC" may be equivalent to the term "Primary Cell (PCell)", and the term "SCC" may be equivalent to the term "Secondary Cell (SCell)".

Multiple cells may operate on the same or different frequency band, and may have the same or different center frequency. Multiple cells may belong to the same base station or different base stations. The term "base station (BS)" in this disclosure may be, for example, a Node-B, an eNode B, a base transceiver system (BTS), an access point, a home base station, a relay station, a scatterer, a repeater, an intermediate node, an intermediary, and/or satellite-based communication base station, etc.

The communication apparatus 64 may be, for example, a server, a client, a desktop computer, a laptop computer, a network computer, a workstation, a personal digital assistant (PDA), a tablet, a scanner, a telephony device, a pager, a camera, a television, a hand-held video game device, a musical device, a wireless sensor, or any other user equipment (UE). In some applications, the communication apparatus 64 may be a fixed computing device operated in a mobile environment, such as a bus, a train, an airplane, a boat, a car, etc.

Figure 7:
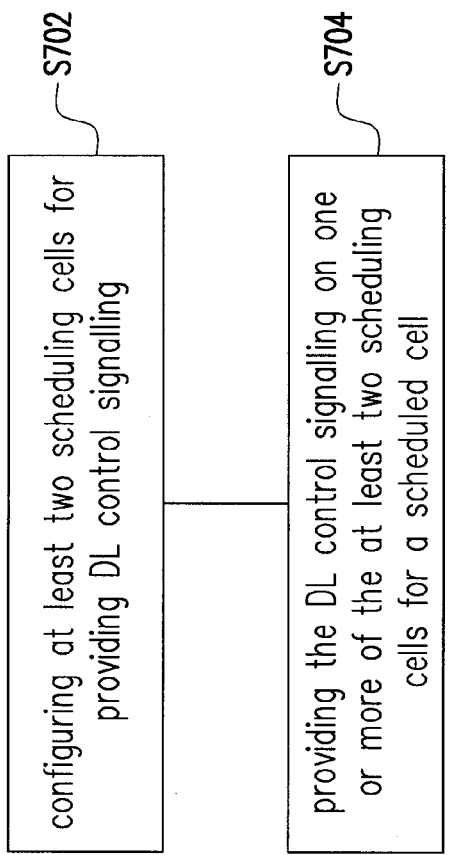
FIG. 7 is a flowchart illustrating a method for providing DL control signalling for a communication apparatus according to an example of the disclosure.

FIG. 7 is a flowchart illustrating a method for providing DL control signalling for a communication apparatus according to an example of the disclosure. The method of this example is applicable to the wireless communication system 60 of FIG. 6, and detailed steps of the method are illustrated below in cooperation with elements in the wireless communication system 60.

Figure 2:
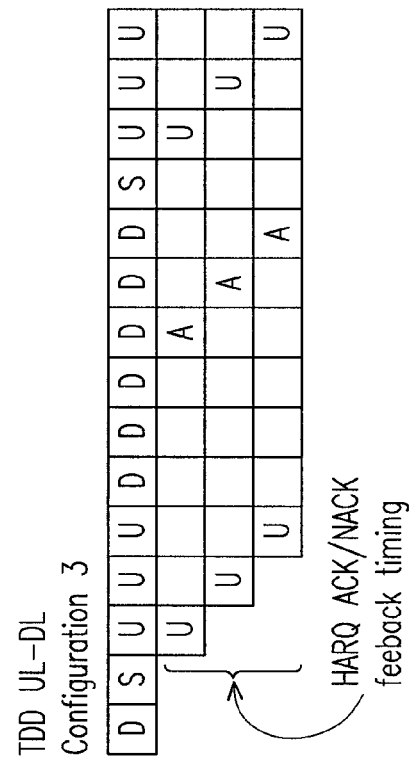
FIG. 2 illustrates a DL ACK/NACK Timing in TDD.
Figure 3:
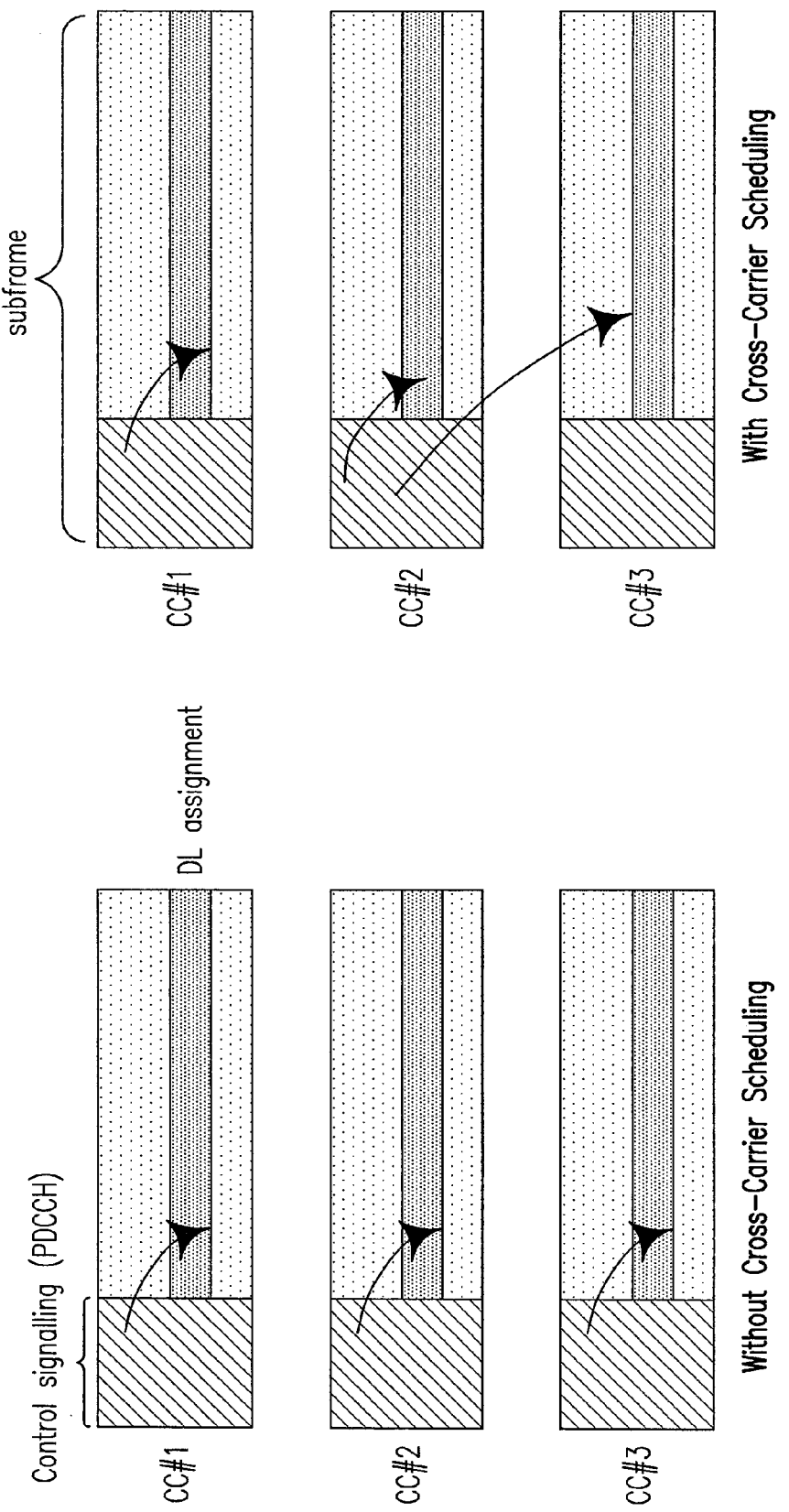
FIG. 3 is a schematic diagram illustrating cross-carrier scheduling.
Figure 4:
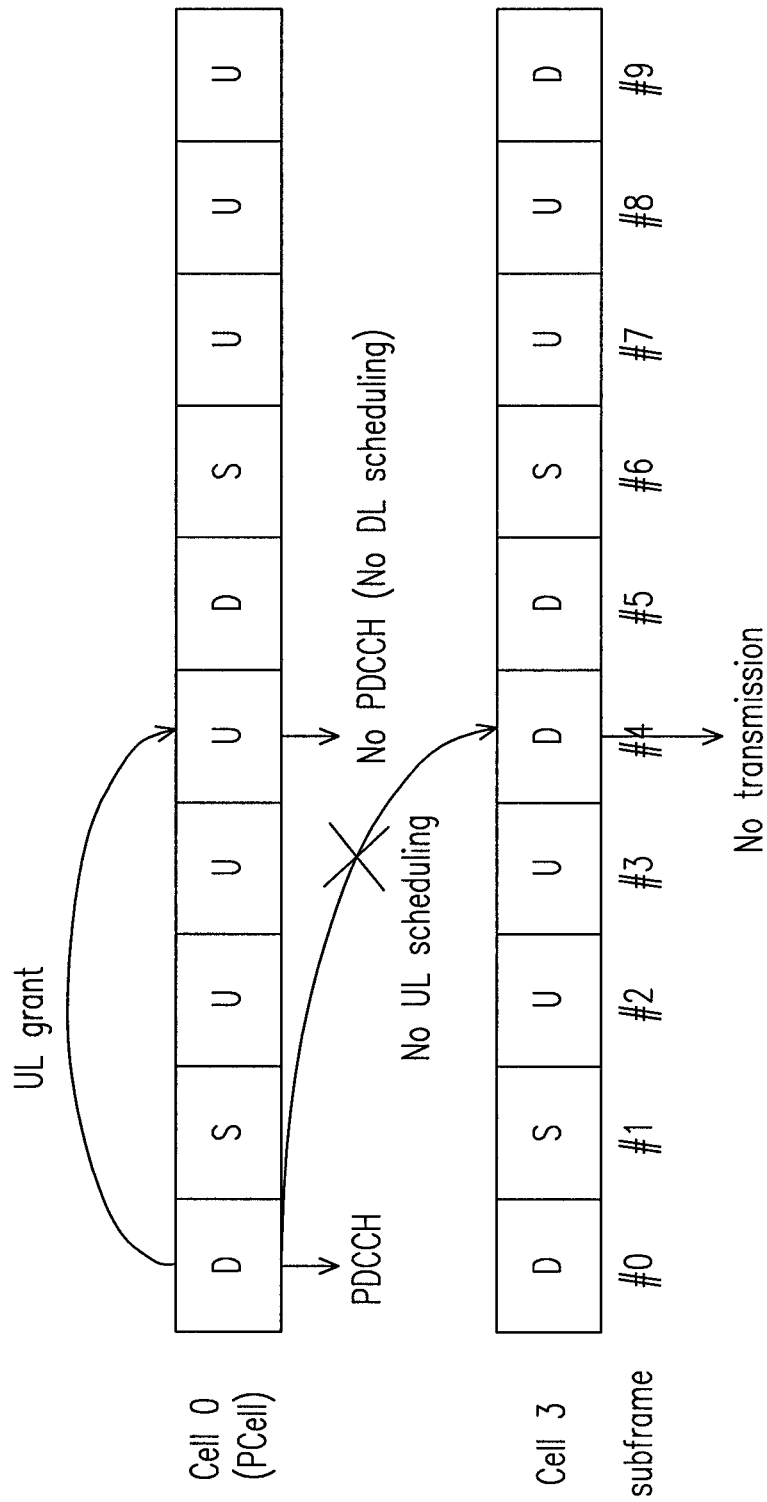
FIG. 4 illustrates an example of no PDCCH on the Scheduling Cell for DL and UL resource assignments.
Figure 5:
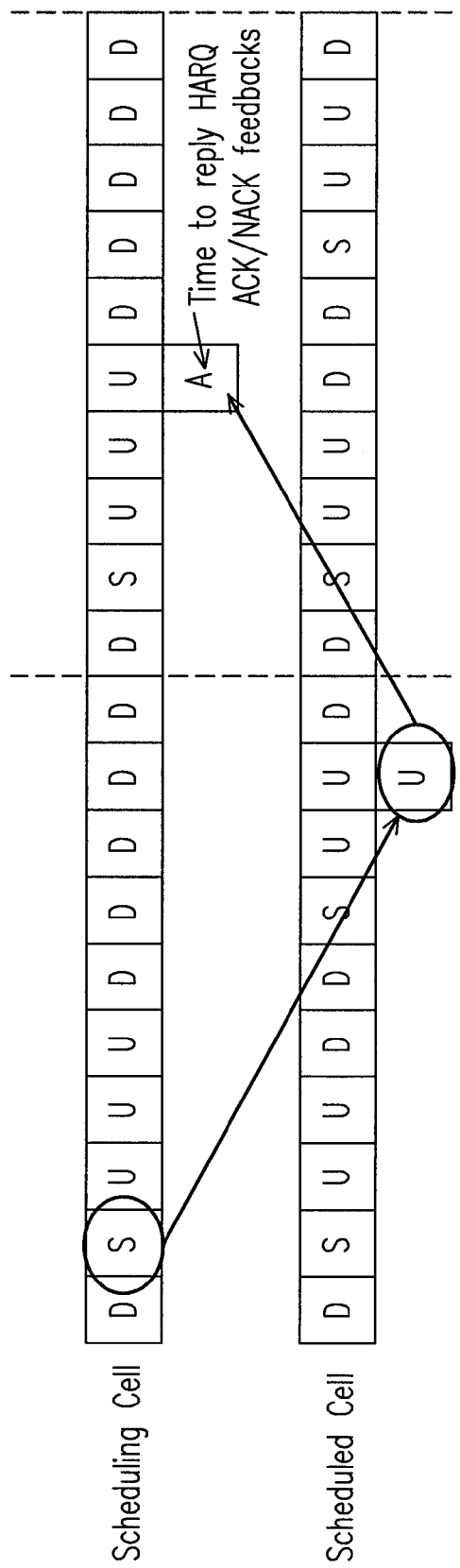
FIG. 5 illustrates an example of HARQ ACK/NACK feedback timing.

First of all, the base station 62 may configure at least two scheduling cells for providing DL control signalling to the communication apparatus 64 (step S702). The scheduling cell of a cell may be the cell itself. For example, referring to FIG. 3, the PDCCH and/or PHICH of cell#2 may provide DL control signalling for the cell#2 itself.

In step S702, the base station 62 (e.g., eNodeB) may send a message (e.g., a RRC message (RRCConnectionReconfiguration)) to configure (or add) a scheduled cell for the communication apparatus 64. The base station 62 may configure at least two scheduling cells for the communication apparatus 64 (e.g., in the same (RRC) message). The scheduling cell provides DL control signalling for a scheduled cell. The DL control signalling may include at least one of the following parameters.

a. DL and/or UL grant resource assignment information (e.g., by PDCCH);

b. HARQ ACK/NACK feedbacks (e.g., by PHICH) for previous UL transmission;

c. Synchronization Channel for DL timing synchronization (e.g., PSCH, SSCH);

d. System information (e.g., MIB, SIB1, SIB2, . . . , etc.); and e. Reference Signalling (e.g., common RS, CSI-RS, DMRS, etc.).

The PDCCH of a scheduling cell may dynamically allocate resources (e.g., physical resource blocks (PRBs) and modulation coding schemes (MCS)) for one or more cells. Thus, an indication (e.g., carrier indicator field (CIF)) may be included in the PDCCH of the scheduling cell to indicate the cell identity (e.g., CellIndex) of the scheduled cell. The scheduling cells and/or scheduled cell may have same or different duplex mode (e.g., FDD or TDD) and may have same or different UL-DL configuration, which is not limited herein.

In an example, the base station 62 may configure communication apparatus 64 with at least two scheduling cells for a scheduled cell. For example, the base station 62 may configure cell#1 and cell#2 to be the scheduling cell of cell#3, and these two scheduling cells may work for the same subframe. In another example, the base station 62 may configure communication apparatus 64 with a first scheduling cell for the cell#1 and a second scheduling cell for the cell#2, in which the second scheduling cell may sometimes be the scheduling cell of the cell#1. In other words, the two scheduling cells may provide DL control signalling for the scheduled cell for the same subframe (e.g., at the same time (TTI)), and/or for different subframes (e.g., the scheduling cell for the scheduled cell is time dependent). In yet another example, the scheduling cells may work for the same subframes at some TTIs, and may work for different subframes at the other TTIs.

It is noted that, after the scheduling cells and the scheduled cell are configured, the base station 62 may send a message (e.g., an Activation/Deactivation MAC control element) to the communication apparatus 64 so as to activate the scheduled cell. The base station 62 may also activate at least a scheduling cell for the scheduled cell (e.g., if none of the scheduling cells for the scheduled cell has been activated). When receiving the message, the communication apparatus 64 may activate the cell. For example, the communication apparatus 64 may execute following actions for an activated cell.

a. transmitting sounding reference symbol (SRS) on the cell; and/or b. reporting channel quality indicator (CQI)/precoding matrix indicator (PMI)/rank indicator (RI)/precoding type indicator (PTI) for the cell; and/or c. starting or re-starting a timer (e.g., sCellDeactivation-Timer) associated with the Cell; and/or d. monitoring DL control signalling (e.g., PDCCH) on corresponding scheduling cell(s) for the cell (at the corresponding TTI).

Once the scheduled cell is activated, the base station 62 may provide the DL control signalling on one or more of the at least two scheduling cells for the scheduled cell (step S704). However, the communication apparatus 64 may not need to monitor DL control signalling for the scheduled cell at each subframe (and at each TTI). In some embodiments, the communication apparatus 64 may determine whether to monitor DL control signalling on the scheduling cell at a TTI based on the UL-DL configuration of the scheduled cell. In an example, the communication apparatus 64 may monitor DL control signalling for the scheduled cell at the time only when the scheduled cell has DL resources (i.e. at a DL subframe). That is, the communication apparatus 64 may not monitor DL control signalling on the scheduling cell for the scheduled cell at the TTI when the scheduled cell has only UL. In another example, when the timealignmenttimer is not running, the communication apparatus 64 may not monitor DL control signalling for the scheduled cell at the time when the scheduled cell has only UL (i.e. at a UL subframe). But, when the timealignmenttimer is running, the communication apparatus 64 may monitor DL control signalling for the scheduled cell no matter the scheduled cell is at a DL or UL subframe. It is noted that if the PDCCH on a scheduling cell indicates UL grant or DL assignment for the scheduled cell, the communication apparatus 64 may restart the corresponding timer(s) (e.g., sCellDeactivationTimer) associated with corresponding cell(s). Examples of the base station configuring the scheduling cells and the communication apparatus monitoring the DL control signalling are provided below for further illustration.

EXAMPLE 1

Figure 8:
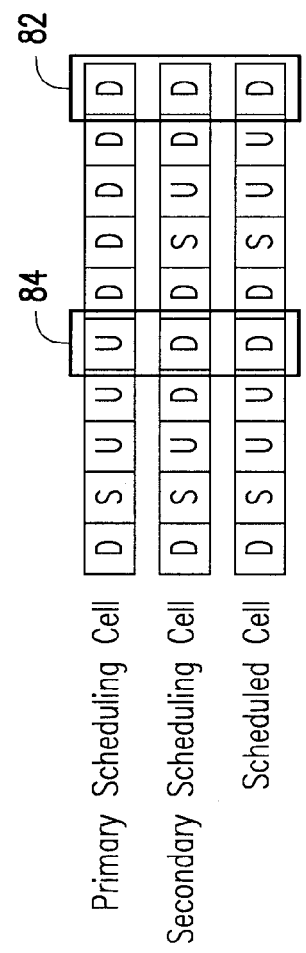
FIG. 8 is an example of a method for providing DL control signalling for a communication apparatus according to an example of the disclosure.

FIG. 8 is an example of a method for providing DL control signalling for a communication apparatus according to an example of the disclosure. In this example, the base station may configure two scheduling cells for a scheduled cell having a UL-DL configuration#1. One is primary scheduling cell having a UL-DL configuration#3, and the other is secondary scheduling cell having a UL-DL configuration#2. The communication apparatus may receive a message to activate these two scheduling cells and the scheduled cell. Then, the communication apparatus may monitor DL control signalling (e.g., PDCCH and/or PHICH) on the primary scheduling cell for the scheduled cell at some TTIs (e.g. TTI 82), and switch to monitor DL control signalling on the secondary scheduling cell for the scheduled cell at some TTIs (e.g. TTI 84) when there is no available DL resource (e.g., PDCCH and/or PHICH) on the primary scheduling cell. To be specific, at TTI 84, the primary scheduling cell may be in a UL subframe, or the primary scheduling cell is deactivated or de-configured (removed).

EXAMPLE 2

Figure 9:
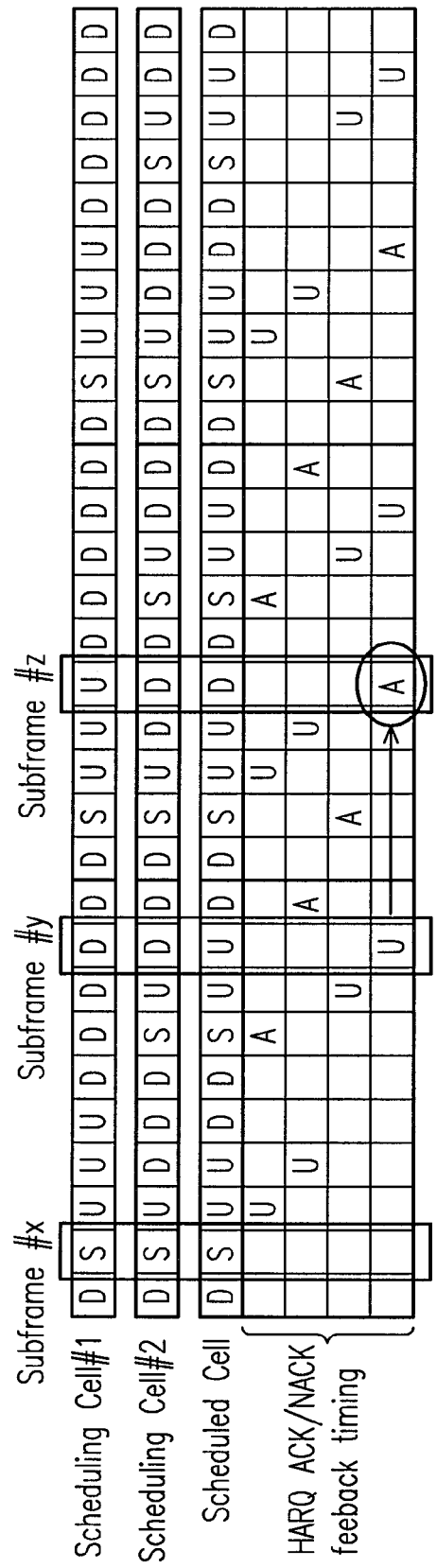
FIG. 9 is an example of a method for providing DL control signalling for a communication apparatus according to an example of the disclosure.

FIG. 9 is an example of a method for providing DL control signalling for a communication apparatus according to an example of the disclosure. In this example, the base station may configure at least two scheduling cells (e.g. a scheduling cell#1 and a scheduling cell#2) for providing DL control signalling of a scheduled cell. When receiving a message to activate the scheduling cells #1 and #2 and the scheduled cell, the communication apparatus may monitor DL control signalling on the scheduling cell with highest priority (among all "activated" and/or "DL-available" scheduling cells) for the scheduled cell. The "priority" may be determined by at least one of the following criteria:

a. the priority of a scheduling cell may be assigned/configured by the base station when the Cell is added or configured;

b. a cell having a smaller cell_index (e.g, CellIndex, SCellIndex) may has higher priority, in which each cell may be configured with an apparatus-specific cell_index, and the PCell may have the smallest cell_index (e.g., 0);

c. a cell which is configured with more DL subframes may have higher priority;

d. the TDD UL-DL configuration index is used to prioritize the cells; and e. a cell having a better channel quality (e.g., CQI, PMI, RI, PTI, BER, RSRP, RSRQ, etc.) may have a higher priority.

Referring to FIG. 9, DL HARQ ACK/NACK feedback is illustrated. In this example, the DL ACK/NACK feedbacks may be not sent from the scheduling cell where the corresponding UL grant is assigned, but from the scheduling cell which has available DL subframe (or PHICH) at some TTIs. In this example, the scheduling cell having a smaller cell_index is assigned to have higher priority. Then, the communication apparatus may monitor PDCCH at subframe #x on scheduling cell#1 (i.e. with higher priority) for the UL grant at subframe #y on the scheduled cell. If the communication apparatus sends a UL transmission on scheduled cell at subframe #y, the communication apparatus may expect to receive the corresponding HARQ ACK/NACK feedback at subframe #z. The communication apparatus may monitor the PHICH at subframe #z on the scheduling cell#2 (i.e., with higher priority) to receive the HARQ ACK/NACK feedback for the UL transmission at subframe #y, and/or may monitor PDCCH on the scheduling cell#2 (with higher priority) to receive DL resource allocation information at subframe #z for the scheduled cell.

EXAMPLE 3

In this example, the base station may configure one scheduling cell for a scheduled cell first. When the scheduled cell is activated, the communication apparatus may monitor the DL control signalling on the scheduling cell for the scheduled cell. When there is no available DL resource on the configured scheduling cell at a TTI (e.g., the scheduling cell has only UL resource at this TTI or the scheduling cell is deactivated or de-configured), the communication apparatus may monitor DL control signalling on another pre-defined "backup" cell for the scheduled cell. For example, the communication apparatus may switch to monitor the DL control signalling on the backup cell when the scheduling cell has only UL subframe at the TTI or when the primary scheduling cell is deactivated or de-configured (removed). The backup cell may be a PCell or the scheduled cell itself, and may be indicated by the base station through a message (e.g., by which the SCell is configured (added) to the communication apparatus).

EXAMPLE 4

In this example, the base station may configure one scheduling cell for a scheduled cell first. When the scheduled cell is activated, the communication apparatus may monitor the DL control signalling on the scheduling cell for the scheduled cell. When there is no available DL resource on the configured scheduling cell for the scheduled cell at a TTI (e.g., the scheduling cell has only UL resource at this TTI or the scheduling cell is deactivated or de-configured), another scheduling cell which may be configured for scheduling other scheduled cell may become the scheduling cell of the scheduled cell (for this TTI). The communication apparatus may need to determine which cell becomes the scheduling cell for the scheduled cell at this TTI. In some embodiments, the determination may be based on a priority. In one example, a pre-defined priority order is given in RRC message. In another example, the cell may have a highest priority if it has a smallest cell index among the scheduling cells having available DL subframe (or PDCCH) at this TTI. In some embodiments, the determination may be based on the configured DL resources. For example, the scheduling cell which is configured with more DL subframes may become the new scheduling cell of the scheduled cell. In some embodiments, the determination may be based on the channel condition. For example, the scheduling cell having a better channel condition (e.g., CQI, PMI, RI, PTI, BER, RSRP, RSRQ, . . . , etc.) may become the new scheduling cell of the scheduled cell.

EXAMPLE 5

Figure 10:
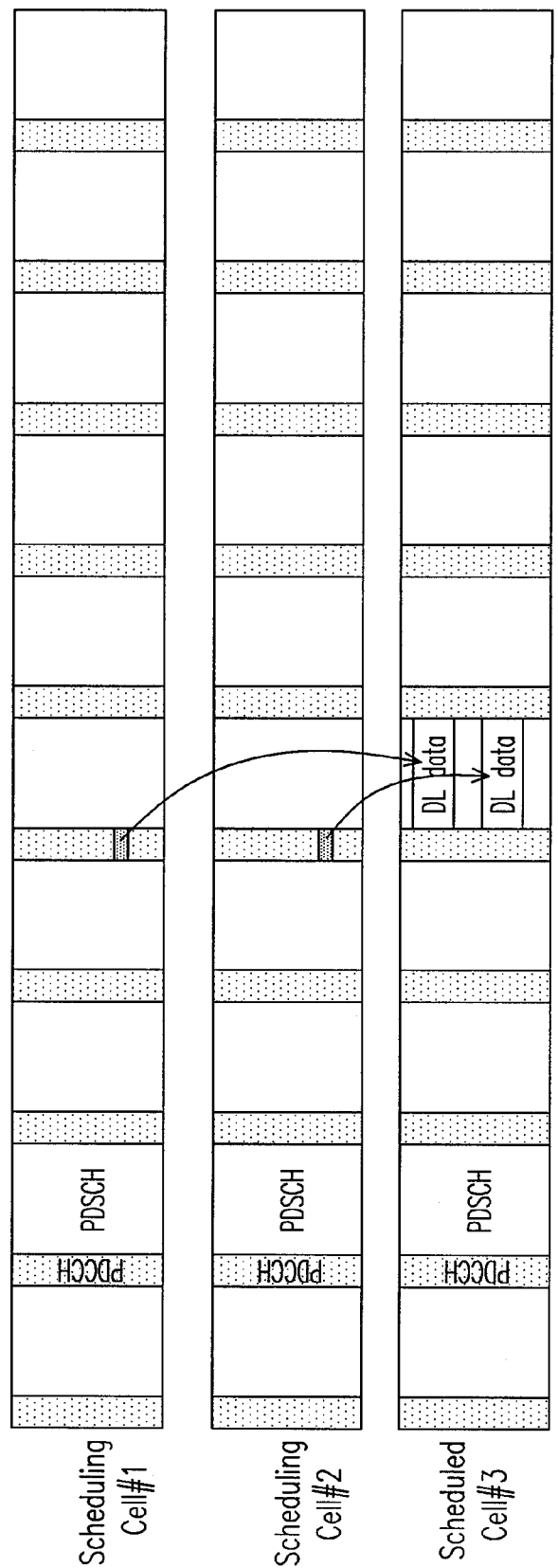
FIG. 10 is an example of a method for providing DL control signalling for a communication apparatus according to an example of the disclosure.

FIG. 10 is an example of a method for providing DL control signalling for a communication apparatus according to an example of the disclosure. In this example, the base station may configure at least two scheduling cells (e.g. a scheduling cell#1 and a scheduling cell#2) for a scheduled cell, in which the scheduling cells #1 and #2 may provide different DL control signalling for the scheduled cell at the same subframe (at the same TTI). Referring to FIG. 10, both scheduling cells #1 and #2 provide DL control signalling for the scheduled cell#3 at the same time. In some embodiments, the two DL control signalling indicate two different portions of radio resources of a subframe. In an example, these two portions of radio resources may be used to transmit different data packet. In another example, these two portions of radio resources may be used to transmit the same data packet, or transmit different redundancy versions (e.g., HARQ Redundancy version #0, #1, #2, #3) of the same data packet.

In another embodiment, both scheduling cells provide only a part of DL control information for the scheduled cell at the same subframe. The communication apparatus may combine the DL control signalling from the scheduling cells together to get complete DL control information for the scheduled cell. Since the DL channel capacity is limited, the DL control information may be separately transmitted on the two scheduling cells. For example, one scheduling cell may provide the PDCCH (i.e., radio resource allocation information such as DL assignment and/or UL grant assignment), and the other scheduling cell may provide the PHICH (i.e., HARQ ACK/NACK feedbacks). In another example, the communication apparatus may receive DL control signalling from both scheduling cells and perform signalling combing on the received DL control signalling, so as to increase the reliability of the received DL control information. In brief, the communication apparatus may monitor DL control signalling on all (activated) scheduling cells for the scheduled cell.

EXAMPLE 6

Figure 11:
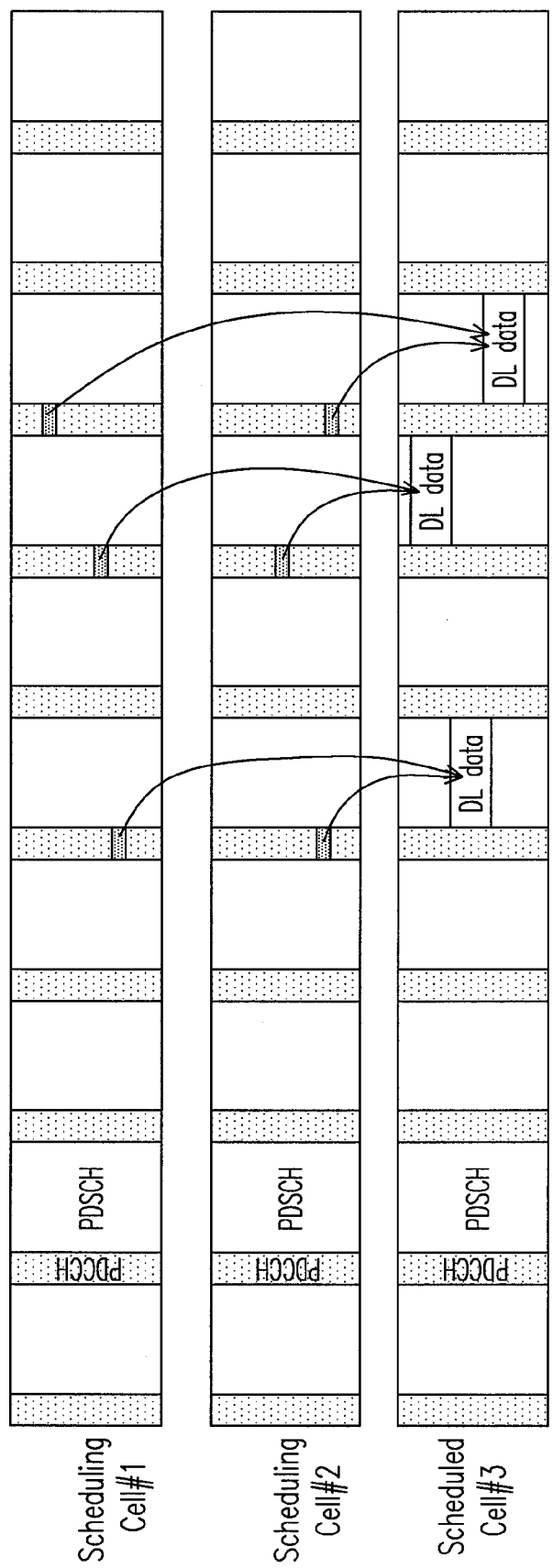
FIG. 11 is an example of a method for providing DL control signalling for a communication apparatus according to an example of the disclosure.

FIG. 11 is an example of a method for providing DL control signalling for a communication apparatus according to an example of the disclosure. In this example, the base station may configure at least two scheduling cells (e.g. a scheduling cell#1 and a scheduling cell#2) for a scheduled cell, in which the scheduling cells #1 and #2 may provide the same DL control signalling for the scheduled cell at the same subframe. Referring to FIG. 11, both scheduling cells #1 and #2 indicate the same DL control information (e.g., DL and/or UL resource assignment information, HARQ ACK/NACK feedbacks, etc.) for the scheduled cell#3, so as to increase PDCCH reliability. In another example, the communication apparatus may not need to monitor or decode all scheduling cells, if the communication apparatus has successfully received or decoded the DL control information from one scheduling cell. In yet another example, the communication apparatus may receive DL control signalling from both scheduling cells #1 and #2, perform signalling combing on the received DL control signalling, and decode the combined DL control information for the scheduled cell, so as to reduce the error rate of DL control channel.

EXAMPLE 7

In this example, the base station may configure at least two scheduling cells for a scheduled cell, in which the base station may configure a scheduling pattern for each scheduling cell for the scheduled cell. The scheduling pattern may indicate the communication apparatus which subframes the base station may send DL control signalling on the corresponding scheduling cell for the scheduled cell. In an example, the scheduling pattern may include a bitmap, in which each bit in the bitmap indicates whether there may be DL control signalling at the corresponding subframe on the corresponding scheduling cell. In another example, the scheduling pattern may indicate that a scheduling cell #1 provides DL control signalling for the scheduled cell at odd subframes, and a scheduling cell #2 provides the DL control signalling for the scheduled cell at even subframes. This scheduling pattern may be configured by the same SCell configuration message (e.g., RRCConnectionReconfiguration), by which the scheduled cell is configured (or added) to the communication apparatus. When the scheduled cell is active, the communication apparatus may monitor DL control signalling on (activated) scheduling cells for scheduled cell based on the scheduling pattern.

EXAMPLE 8

Figure 12:
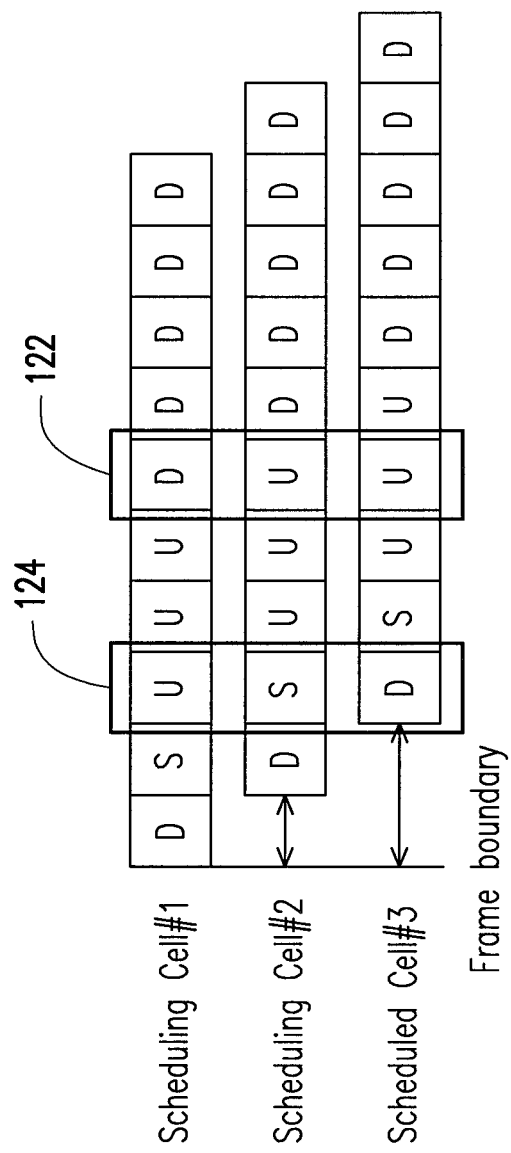
FIG. 12 is an example of a method for providing DL control signalling for a communication apparatus according to an example of the disclosure.

The disclosure could be used not only for CA with different TDD UL-DL configurations, but also for CA with the same TDD UL-DL configuration. For example, FIG. 12 is an example of a method for providing DL control signalling for a communication apparatus according to an example of the disclosure. In this example, carrier aggregation with the same TDD UL-DL configuration is illustrated. The frame boundary between aggregated cells (e.g. scheduling cells #1 and #2 and scheduled cell #3) may be not aligned or synchronized, but the subframe boundary may be aligned. Of course, the disclosure can be applied to different TDD UL-DL configurations without frame boundary alignment. In this example, the communication apparatus may monitor DL control signalling on scheduling cell #1 for scheduled cell #3 at TTI 122, and switch to monitor DL control signalling on scheduling cell #2 for scheduled cell #3 at TTI 124 when there is no available DL resource (e.g., PDCCH and/or PHICH) on the scheduling cell #1.

EXAMPLE 9

Figure 13:
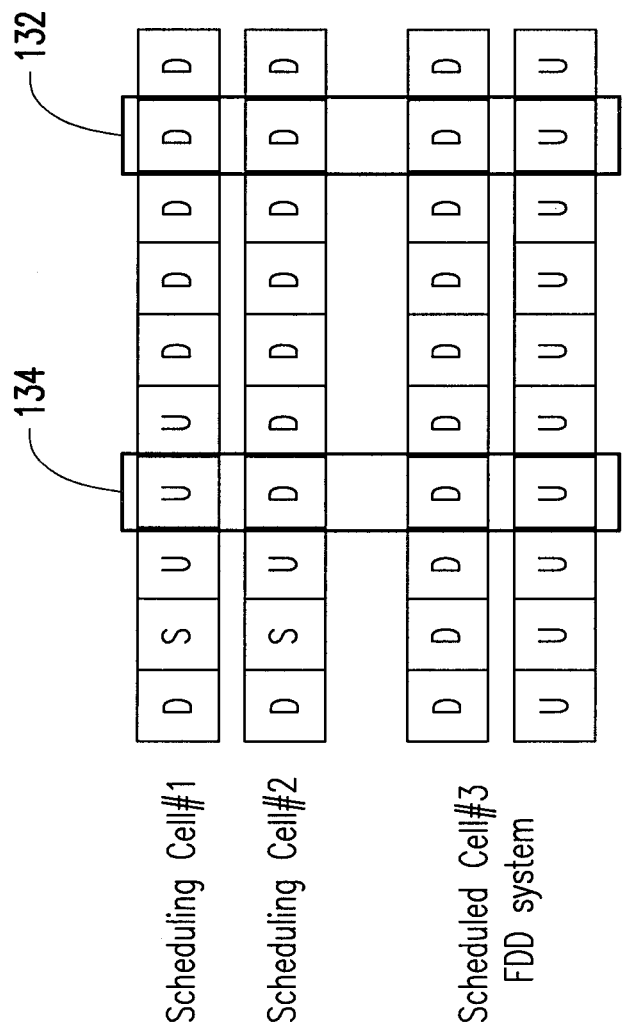
FIG. 13 is an example of a method for providing DL control signalling for a communication apparatus according to an example of the disclosure.

The disclosure could be used for TDD and FDD combined carrier aggregation. In this example, the communication apparatus is configured with two cells. One adopts time division duplex (TDD) system and the other adopts frequency division duplex (FDD) system. All of previous examples could apply. For example, FIG. 13 is an example of a method for providing DL control signalling for a communication apparatus according to an example of the disclosure. Referring to FIG. 13, the scheduled cell #3 adopts a FDD system, and the scheduling cells #1 and #2 adopt TDD system and have different UL-DL configurations (i.e. UL-DL configurations #3 and #5). In this example, the communication apparatus may monitor DL control signalling on scheduling cell #1 for scheduled cell #3 at TTI 132, and switch to monitor DL control signalling on scheduling cell #2 for scheduled cell #3 at TTI 134 when there is no available DL resource (e.g., PDCCH and/or PHICH) on the scheduling cell #1.

It is noted that when the DL control signalling is detected, if the PDCCH received on the scheduling cell indicates an UL grant or DL assignment for the scheduled cell, the communication apparatus may restart the activation/deactivation timer (e.g., sCellDeactivationTimer) associated with the scheduled cell, and/or restart the timer (e.g., sCellDeactivationTimer) associated with the scheduling cell from which the PDCCH is received. In another example, the communication apparatus may restart the timer (e.g., sCellDeactivationTimer) associated with all (activated) scheduling cell(s) of the scheduled cell.

When the timer (e.g., sCellDeactivationTimer) associated with the activated cell expires and/or the communication apparatus receives a message (e.g., Activation/Deactivation MAC control element) to deactivate the cell from the base station, the communication apparatus may deactivate the Cell, stop the timer (e.g., sCellDeactivationTimer) associated with the cell, flush all HARQ buffers associated with the Cell, not transmit SRS on the Cell, not report CQI/PMI/RI/PTI for the Cell, not transmit on UL-SCH on the Cell, stop on going Random Access procedure on the Cell, not monitor DL control signalling (e.g., PDCCH) on corresponding scheduling Cell(s) for the Cell, or perform a combination of aforesaid actions. If the communication apparatus receives a message (e.g., RRCConnectionReconfiguration message) to de-configure (or remove) a cell from the base station, the communication apparatus may de-activate and/or de-configure (remove) the cell.

As described above, in the method and the system for providing DL control signalling for a communication apparatus of the disclosure, multiple scheduling cells with the same or different UL-DL configurations are configured to provide DL control signalling for a scheduled cell, in which the scheduling cells may work for the same or different subframes. Accordingly, the scheduling cells for providing the DL control signalling can be dynamically changed, and the base station can flexibly use limited bandwidth to achieve high throughput and capacity.

It will be apparent to those skilled in the art that various modifications and variations can be made to the structure of the disclosed examples without departing from the scope or spirit of the disclosure. In view of the foregoing, it is intended that the disclosure cover modifications and variations of this disclosure provided they fall within the scope of the following claims and their equivalents.

What is claimed is:

1. A method for providing downlink (DL) control signalling for a communication apparatus, adapted to a base station, comprising:
    configuring at least two scheduling cells for providing DL control signalling; and
    providing the DL control signalling on one or more of the at least two scheduling cells for a scheduled cell, switching to provide DL control signaling on an another scheduling cell of the at least two scheduling cells for the scheduled cell at another subframe,
    wherein the step of providing the DL control signalling on the one or more of the at least two scheduling cells for the scheduled cell comprises:
    providing the DL control signalling on the scheduling cell with a highest priority for the scheduled cell, wherein the priority of the at least two scheduling cells is determined according to a configured priority, an index value of the scheduling cell, a number of DL subframes configured to the scheduling cell, an order of the scheduling cell in an UL-DL configuration index or channel quality of the scheduling cell.

2. The method for providing DL control signalling for a communication apparatus according to claim 1, wherein the step of configuring the at least two scheduling cells for providing DL control signalling comprises:
    configuring a scheduling pattern for the at least two scheduling cells, wherein the scheduling pattern indicates the scheduling cell configured for providing DL control signalling of each subframe of the scheduled cell.

3. The method for providing DL control signalling for a communication apparatus according to claim 2, wherein the scheduling pattern is configured as a bitmap.

4. The method for providing DL control signalling for a communication apparatus according to claim 1, wherein in the step of providing the DL control signalling on the one or more of the at least two scheduling cells for the scheduled cell, the at least two scheduling cells provide the DL control signalling for allocating a same portion or different portions of radio resources of a same subframe of the scheduled cell.

5. The method for providing DL control signalling according to claim 1, wherein in the step of providing the DL control signalling on the one or more of the at least two scheduling cells for the scheduled cell, the at least two scheduling cells provide the DL control signalling for different subframes of the scheduled cell.

6. The method for providing DL control signalling for a communication apparatus according to claim 1, wherein in the step of providing the DL control signalling on the one or more of the at least two scheduling cells for the scheduled cell, one of the at least two scheduling cells provide resource allocation information while another one of the at least two scheduling cells provide an ACK/NACK feedback.

7. The method for providing DL control signalling for a communication apparatus according to claim 1, wherein before the step of providing the DL control signalling on the one or more of the at least two scheduling cells for the scheduled cell, the method further comprises:
    sending a message to the communication apparatus to activate the scheduled cell; and
    sending the message to activate the one or more of the at least two scheduling cells.

8. The method for providing DL control signalling for a communication apparatus according to claim 1, wherein after the step of providing the DL control signalling on the one or more of the at least two scheduling cells for the scheduled cell, the method further comprises:
    switching to transmit an ACK/NACK feedback on another scheduling cell based on whether the scheduling cell is at an UL subframe, deactivated or de-configured.

9. The method for providing DL control signalling for a communication apparatus according to claim 1, wherein the at least two scheduling cells are configured with different TDD UL-DL configuration.

10. The method for providing DL control signalling for a communication apparatus according to claim 1, wherein frame boundaries of the at least two scheduling cells and the scheduled cell are not aligned while subframe boundaries of the at least two scheduling cells and the scheduled cell are aligned.

11. The method for providing DL control signalling for a communication apparatus according to claim 1, wherein the at least two scheduling cells adopt time division duplex (TDD) systems and the scheduled cell adopts frequency division duplex (FDD) system.

12. The method for providing DL control signalling for a communication apparatus according to claim 1, wherein the at least two scheduling cell comprises the scheduled cell itself.

13. The method for providing DL control signalling for a communication apparatus according to claim 1, wherein the DL control signalling comprises DL and/or UL grant resource assignment information, HARQ ACK/NACK feedbacks, a synchronization channel for DL timing synchronization, system information, a reference signalling, or a combination thereof.

14. The method for providing DL control signalling for a communication apparatus according to claim 1, wherein the step of providing the DL control signalling on the one or more of the at least two scheduling cells for the scheduled cell comprises:
    providing DL control signalling on one of the at least two scheduling cells for the scheduled cell at a subframe; and
    switching to provide DL control signalling on an another scheduling cell of the at least two scheduling cells for the scheduled cell at another subframe.

15. The method for providing DL control signalling for a communication apparatus according to claim 14, wherein the step of providing the DL control signalling on the one or more of the at least two scheduling cells for the scheduled cell comprises:
    providing the DL control signalling for the scheduled cell only when the scheduled cell is at a DL subframe based on a UL-DL configuration configured to the scheduled cell.

16. The method for providing DL control signalling for a communication apparatus according to claim 14, wherein the step of switching to provide the DL control signalling on the another scheduling cell of the at least two scheduling cells for the scheduled cell comprises:
    switching the scheduling cell providing the DL control signalling among the at least two scheduling cells based on whether the scheduling cell is at an uplink (UL) subframe, deactivated or de-configured.

17. A method for receiving downlink (DL) control signalling from a base station, adapted to a communication apparatus, comprising:
    being configured at least two scheduling cells for receiving DL control signalling from the base station; and receiving the DL control signalling on one or more of the at least two scheduling cells for a scheduled cell, switching to provide DL control signaling on an another scheduling cell of the at least two scheduling cells for the scheduled cell at another subframe, wherein the step of receiving the DL control signalling on the one or more of the at least two scheduling cells for the scheduled cell comprises:
    monitoring the DL control signalling on the scheduling cell with a highest priority for the scheduled cell, wherein the priority of the at least two scheduling cells is determined according to a configured priority, an index value of the scheduling cell, a number of DL subframes configured to the scheduling cell, an order of the scheduling cell in an UL-DL configuration index or channel quality of the scheduling cell.

18. The method for receiving DL control signalling from a base station according to claim 17, wherein the step of receiving the DL control signalling on the one or more of the at least two scheduling cells for the scheduled cell comprises:
    receiving a control signalling on the scheduling cell; and
    restarting an activation/deactivation timer associated with the scheduled cell, associated with the scheduling cell from which the control signalling is received, or associated with all activated scheduling cells of the scheduled cell if the control signalling indicates an UL grant or DL assignment for the scheduled cell.

19. The method for receiving DL control signalling from a base station according to claim 17, wherein after the step of receiving the DL control signalling on the one or more of the at least two scheduling cells for the scheduled cell, the method further comprises:
    switching to receive an ACK/NACK feedback from another scheduling cell based on whether the scheduling cell is at an UL subframe, deactivated or de-configured.

20. The method for receiving DL control signalling from a base station according to claim 17, wherein in the step of receiving the DL control signalling on the one or more of the at least two scheduling cells for the scheduled cell, the method further comprises:
monitoring the DL control signalling from one of the at least two scheduling cells for the scheduled cell at a subframe; and
switching to monitor the DL control signalling from another one of the at least two scheduling cells for the scheduled cell at another subframe.

21. The method for receiving DL control signalling from a base station according to claim 20, wherein the step of monitoring the scheduling cell providing the DL control signalling comprises:
monitoring the DL control signalling for the scheduled cell only when the scheduled cell is at a DL subframe based on a UL-DL configuration configured to the scheduled cell.

22. The method for receiving DL control signalling from a base station according to claim 20, wherein the step of switching to monitor another scheduling cell providing the DL control signalling comprises:
switching to monitor the DL control signalling among the at least two scheduling cells based on whether the scheduling cell is at an UL subframe, deactivated or de-configured.

23. A wireless communication system for providing DL control signalling, comprising:
a communication apparatus; and a base station, configured to configure at least two scheduling cells for providing DL control signalling to the communication apparatus, and provide the DL control signalling on one or more of the at least two scheduling cells for a scheduled cell, switching to provide DL control signaling on an another scheduling cell of the at least two scheduling cells for the scheduled cell at another subframe,
wherein the scheduling cell having a highest priority provides the DL control signalling for the scheduled cell, wherein the priority of the at least two scheduling cells is determined according to a configured priority, an index value of the scheduling cell, a number of DL subframes configured to the scheduling cell, an order of the scheduling cell in an UL-DL configuration index or channel quality of the scheduling cell.

24. The wireless communication system for providing DL control signalling for a communication apparatus according to claim 23, wherein the base station configures a scheduling pattern for the at least two scheduling cells, wherein the scheduling pattern indicates the scheduling cell configured for providing DL control signalling of each subframe of the scheduled cell.

25. The wireless communication system for providing DL control signalling for a communication apparatus according to claim 24, wherein the scheduling pattern is configured as a bitmap.

26. The wireless communication system for providing DL control signalling for a communication apparatus according to claim 23, wherein the at least two scheduling cells provide the DL control signalling for allocating a same portion or different portions of radio resources of a same subframe of the scheduled cell.

27. The wireless communication system for providing DL control signalling for a communication apparatus according to claim 23, wherein the at least two scheduling cells provide the DL control signalling for different subframes of the scheduled cell.

28. The wireless communication system for providing DL control signalling for a communication apparatus according to claim 23, wherein one of the at least two scheduling cells provide resource allocation information for a subframe of the scheduled cell while another one of the at least two scheduling cells provide an ACK/NACK feedback.

29. The wireless communication system for providing DL control signalling for a communication apparatus according to claim 23, wherein the base station sends a message to the communication apparatus to activate the scheduled cell and the one or more of the at least two scheduling cells.

30. The wireless communication system for providing DL control signalling for a communication apparatus according to claim 23, wherein the communication apparatus receiving a control signalling on the scheduling cell, and restarts an activation/deactivation timer associated with the scheduled cell, associated with the scheduling cell from which the control signalling is received, or associated with all activated scheduling cells of the scheduled cell if the control signalling indicates an UL grant or DL assignment for the scheduled cell.

31. The wireless communication system for providing DL control signalling for a communication apparatus according to claim 23, wherein the communication apparatus switches to receive an ACK/NACK feedback from another scheduling cell based on whether the scheduling cell is at an UL subframe, deactivated or de-configured.

32. The wireless communication system for providing DL control signalling for a communication apparatus according to claim 23, wherein the at least two scheduling cells are configured with different TDD UL-DL configuration.

33. The wireless communication system for providing DL control signalling for a communication apparatus according to claim 23, wherein frame boundaries of the at least two scheduling cells and the scheduled cell are not aligned while subframe boundaries of the at least two scheduling cells and the scheduled cell are aligned.

34. The wireless communication system for providing DL control signalling for a communication apparatus according to claim 23, wherein the at least two scheduling cells adopt TDD systems and the scheduled cell adopts FDD system.

35. The wireless communication system for providing DL control signalling for a communication apparatus according to claim 23, wherein the at least two scheduling cell comprises the scheduled cell itself.

36. The wireless communication system for providing DL control signalling for a communication apparatus according to claim 23, wherein the DL control signalling comprises DL and/or UL grant resource assignment information, HARQ ACK/NACK feedbacks, a synchronization channel for DL timing synchronization, system information, a reference signalling, or a combination thereof.

37. The wireless communication system for providing DL control signalling for a communication apparatus according to claim 23, wherein the communication apparatus monitors the DL control signalling from one of the at least two scheduling cells for the scheduled cell at a subframe, and switches to monitor the DL control signalling from another one of the at least two scheduling cells for the scheduled cell at another subframe.

38. The wireless communication system for providing DL control signalling for a communication apparatus according to claim 37, wherein the communication apparatus monitors the DL control signalling for the scheduled cell only when the scheduled cell is at a DL subframe based on a UL-DL configuration configured to the scheduled cell.

39. The wireless communication system for providing DL control signalling for a communication apparatus according to claim 37, wherein the communication apparatus switches to monitor the DL control signalling among the at least two scheduling cells based on whether the scheduling cell is at an UL subframe, deactivated or de-configured.

* * * * *